United States Patent Office 2,979,887
Patented Apr. 18, 1961

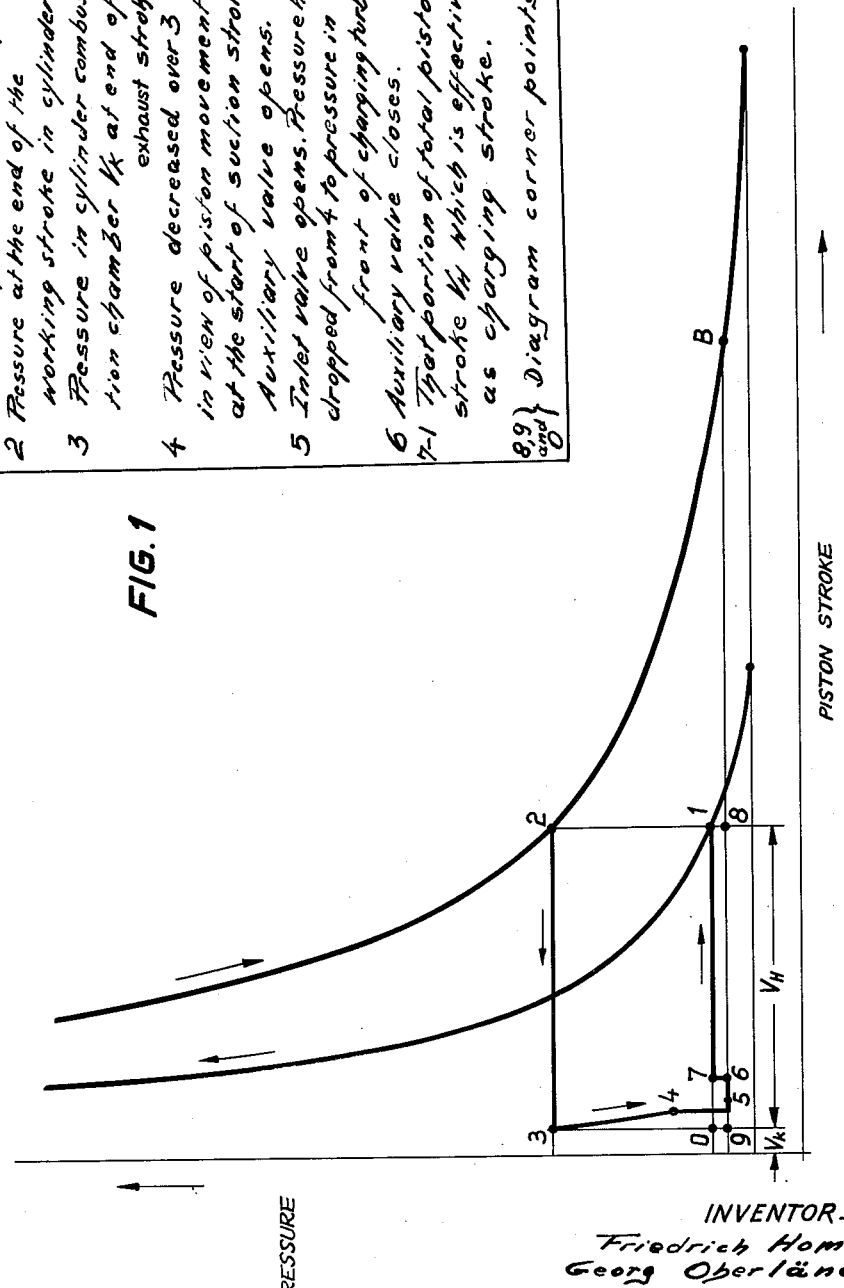

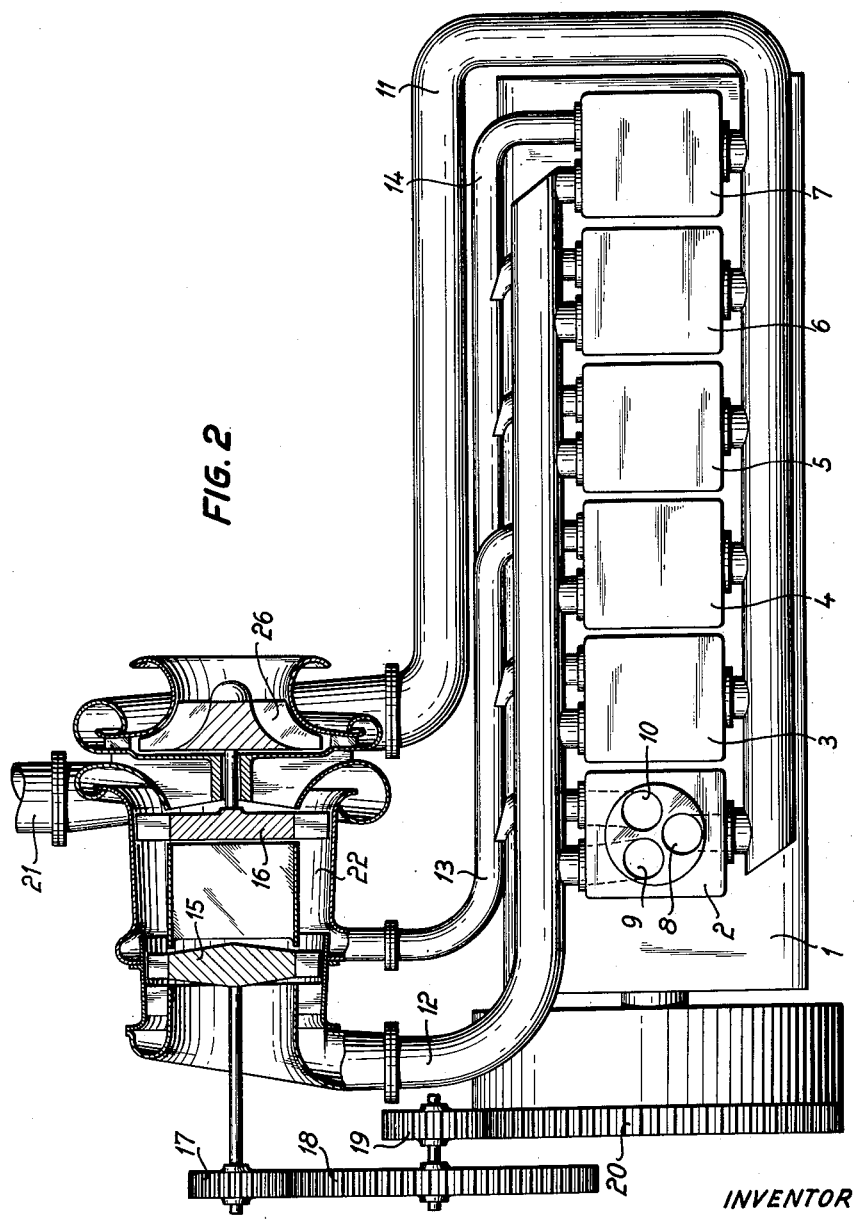

2,979,887
TURBOCHARGED FOUR STROKE CYCLE FUEL INJECTION ENGINE

Friedrich Homola, Koln-Dellbruck, Georg Oberländer, Koln-Riehl, and Otto Elwert, Koln-Lindenthal, Germany, assignors to Klockner-Humboldt-Deutz, Aktiengesellschaft, Koln, Germany Filed Nov. 4, 1957, Ser. No. 694,410

Claims priority, application Germany Nov. 9, 1956

1 Claim. (Cl. 60—13)

The present invention relates to a four-stroke cycle internal combustion engine with fuel injection, which is equipped with a plurality of mechanically independent exhaust gas turbines arranged in such a manner that the exhaust gas flows from one exhaust gas turbine into the other. The arrangement is such that the turbine or turbines into which the exhaust gas flows first, has its or have their useful energy output conveyed for instance to the crankshaft of the internal combustion engine, whereas that turbine which obtains the exhaust gas last, drives a charging compressor.

The problem underlying the present invention consists in so designing a supercharged four-stroke cycle internal combustion engine with fuel injection and to drive such engine in such a manner that on one hand high peak pressures will be avoided which in addition to being dependent on other factors are also dependent on the charging pressure and lead to abnormally greater dimensions of the crank gear system with regard to the diameter of the cylinder, while on the other hand favorable fuel consumption will be obtained, as it was possible heretofore, by an abnormally high supercharge only with correspondingly high peak pressures.

As a solution to the above mentioned problem, it has heretofore been suggested to arrange a plurality of exhaust gas turbines behind an internal combustion engine in such a way that the exhaust gas flows from one turbine to the other turbine, while the various turbines are mechanically independent of each other. The exhaust gas turbines through which the exhaust gas passes first, convey their output to the crankshaft of the engine, whereas that turbine through which the exhaust gas passes last drives a supercharging compressor. With a particular engine of this type, the exhaust gas turbine conveying its output to the crankshaft of the internal combustion engine may be disconnected so that no exhaust gas will pass therethrough and no mechanical connection will exist between the said exhaust gas turbine and other elements of the engine. This disconnection is effected automatically in conformity with the load acting on the internal combustion engine.

These known internal combustion engines, however, bring about only a rather limited improvement in the efficiency of operation. This is due to the fact that with this known type of engine, the maximum selectable counter-pressure must in view of the cylinder scavenging be lower than the charging pressure since otherwise no scavenging of the residual gases from the working cylinders can be effected. On the other hand, however, an effective scavenging of the dead spaces of the cylinder is indispensable if the weight of load of air and thereby also oxygen in the cylinder is to amount to a maximum. The higher this weight, the greater will be the quantity of fuel which can be burned in each working cycle. A greater quantity of burned fuel produces a higher indicated mean pressure. Since the friction losses remain substantially constant, the mechanical degree of efficiency increases, and thus a lower specific fuel consumption will result. These considerations are valid essentially for internal combustion engines in which the exhaust gases are accumulated in front of exhaust gas turbines, and also for engines with impact operation, i.e., such engines in which the kinetic energy of the exhaust gases is partially exploited for driving the turbines.

It is an object of the present invention to provide a four-stroke cycle internal combustion engine with fuel injection of the above-mentioned type, which will bring about a considerable improvement in the degree of efficiency of such engines.

It is a further objet of this invention to provide a four-stroke cycle internal combustion engine as set forth in the preceding paragraph, in which the exhaust valve will over heretofore known engines of the general type involved be subjected to considerable less thermic stress.

These and other objects and advantages of the invention will appear more clearly from the following specification in connection with the accompanying drawings in which:

Fig. 1 illustrates a graph indicating the operation of an internal combustion engine according to the invention.

Fig. 2 is a top view of an internal combustion engine according to the invention.

General arrangement

A considerable improvement in the degree of efficiency of a four-stroke cycle internal combustion engine with fuel injection, in which the turbine or turbines through which the exhaust gases pass first, convey a useful energy output to an element or device of the installation is obtained according to the present invention by the following features:

A. The turbine or turbines through which the exhaust gases pass first have flow passages passed through by the exhaust gases so small in cross sections that the pressure in front of the said turbine or turbines at full load, at which time the charging compressor furnishes the highest charging pressure, will be at least as high as the charging pressure, so that gases are in a manner known per se exhausted over the entire exhaust stroke against a pressure, which is at least as high as the charging pressure.

B. The turbine, which is last to be passed through by exhaust gases and the compressor driven by said turbine, are so designed, that the charging pressure at least at full load is higher than the pressure in front of the exhaust gas turbine, which drives the charging compressor.

C. The pressure, which at the start of the suction stroke of the working piston prevails in the combustion chamber of the cylinder, is reduced by the movement of the working piston and by an auxiliary outlet valve, opening shortly after the working piston has started its suction stroke, to the atmospheric pressure or to approximately the pressure prevailing in front of the compressor driving turbine, before the inlet valve is opened, said auxiliary outlet valve connecting the combustion chamber of the cylinder with the chamber in front of said last mentioned turbine and closes shortly after the inlet valve of the cylinder is opened.

D. The inlet valve is opened only after the pressure in the cylinder has dropped to or below the supercharging pressure.

The main advantage of the internal combustion engine according to the invention consists in that a scavenging of the residual gases will be obtained in spite of the fact that the exhaust gases will be exhausted by the piston of the engine over the entire piston stroke against a pressure which equals or is higher than the supercharging pressure. With a heretofore known internal combustion engine in which the exhaust gases are exhausted over the entire piston stroke against a pressure which is higher than the supercharging pressure, no scavenging of the residual gases is effected or intended. In view of the fact that with the internal combustion engine according to the invention the counter-pressure can be increased up to the expansion end pressure of the gases in the cylinder at the end of the working stroke, which step has heretofore never been materialized, the energy still remaining in said expansion gases can with the engine according to the invention be exploited in an accumulating or damming up operation to a heretofor never obtained degree of efficiency.

A further advantage of the internal combustion engine according to the invention is seen in the low thermic stress of the outlet valve in comparison to the stress of the outlet valve in such engines in which at the end of the expansion stroke the pressure in the cylinder drops suddenly to such an extent that the exhaust gases are exhausted at high speed and a correspondingly large quantity of heat is conveyed to the outlet valve which is heated thereby to a considerable extent.

*Structural arrangement*

The operation of the internal combustion engine according to the invention will best be understood in connection with the graph of Fig. 1. In connection with this graph, it is assumed for instance that an engine is involved in which the pressure prevailing in the dead spaces of the cylinder at the start of the suction stroke is higher than the charging pressure and by the movement of the working piston and by means of an auxiliary outlet valve is reduced to the pressure prevailing in front of the gas turbine driving the supercharging compressor while the gases are then conveyed into the chamber in front of said turbine.

The graph of Fig. 1 representing an idealized diagram clearly shows the course of the pressure in the cylinder during the change of the charge.

With the heretofore customary exhaust turbo supercharging of four-stroke cycle internal combustion engines, the pressure in the cylinder was during the opening of the outlet valve at point 2 reduced substantially to the pressure at point B in front of the turbine, and the exhaust gases were exhausted from the cylinder against the said pressure. The energy of the exhaust gases corresponding to the area 2—B—8—2 could only partially be regained, namely, as far as it occurred in the form of kinetic energy. However, it is well known that this effect in the exhaust gas turbine due to the impact losses brought about by the variable speed or flow of the gases through the turbine brings about a reduction in the degree of efficiency of the turbine. Therefore, actually a small fraction only of the said area 2—B—8—2 can actually be effectively used. Only a relatively small portion of the energy, namely that corresponding to the diagram surface 8—9—0—1 is conveyed to the working piston by means of the exhaust gas turbine and the supercharging compressor. In contrast thereto, with the engine according to the present invention, the exhaust gases are exhausted by the piston against a pressure 2—3 which is higher than the supercharging pressure. In the graph this counter-pressure equals for instance the expansion end pressure in the cylinder. When the outlet valve is opened, the otherwise shock-like pressure associated with supersonic flow and accordingly accompanied by the formation of noise and increased heating of the outlet valve is completely eliminated. The exhaust work is to be performed by the piston so that the power output of the crank shaft will be less. Up to the time when the outlet valve is closed (at point 3), the pressure prevailing in the compression chamber has remained practically unchanged. The gases in the combustion chamber will expand at the start of the suction stroke of the working piston while the valves are still closed and, due to the movement of the piston, will perform work. At point 4, the auxiliary outlet valve opens and establishes communication between the cylinder chamber and the chamber in front of the turbine driving the compressor so that the pressure in the cylinder drops to the pressure prevailing therein which pressure is lower than the supercharging pressure. Now, the inlet valve opens (point 5), and the scavenging air effects a scavenging operation as long as the auxiliary outlet valve is still open so that the exhaust residual gases are swept out of the cylinder. At point 6, the auxiliary outlet valve closes again and the charging air will during the remainder of the suction stroke of the piston flow into the cylinder (stroke 7—1). At point 1, the inlet valve closes and the compression stroke starts.

The work which is to be performed by the piston during the exhaust of the exhaust gases from the cylinder is, as can be seen from the graph of Fig. 1 considerably less than the work which is performed by a turbine in which the expansion of this quantity of exhaust gas from the expansion end pressure in the cylinder to the pressure in front of the turbo charger is effected at a satisfactory degree of efficiency. In this way, the expansion energy of the exhaust gases (2—B—8—2) can be exploited in a considerably more economical manner than was the case with the heretofore known type of turbo charging.

The further expansion of the exhaust gases is effected in the turbine of an exhaust gas turbocharger which may be designed for a supercharging up to 100%.

In further developing the invention, it is suggested that the auxiliary outlet valve, the opening period of which is kept relatively short so that primary residual gases only will escape, is designed in a manner known per se as cone valve with a cylindrical control extension.

The invention may equally successfully be employed with such engines in which the turbine through which the exhaust gases pass first conveys its useful power output to the shaft of the internal combustion engine, as well as with such engines in which it directly conveys its useful output to the next turbine.

In order to improve the scavenging operation, in conformity with a further development of the invention, the conduit leading from the auxiliary outlet valve into the chamber in front of the exhaust gas turbine driving the compressor may in a manner known per se be so dimensioned that the pressure wave entering the conduit when the auxiliary outlet valve is opened will, after reflection at the end of the conduit, arrive in the cylinder as a low pressure wave prior to the closing of the auxiliary outlet valve.

Referring now to Fig. 2 showing the top view of a six-cylinder four-stroke cycle internal combustion engine, the engine shown therein has each of its cylinder heads 2, 3, 4, 5, 6, and 7 provided with three valves, namely, an inlet valve 8, a main outlet valve 9, and an auxiliary outlet valve 10. The inlet side of all cylinders communicates with a collecting manifold 11 common to all cylinders. Similarly, the outlet side of the cylinders for the exhaust gases exhausted through the main outlet valves, is likewise provided with a collecting manifold 12, common to all cylinders. Furthermore, for receiving the exhaust gases exhausted by the auxiliary valves, there is provided a collecting manifold 13 for the cylinders 2, 3 and 4, while a collecting manifold 14 is provided for the cylinders 5, 6 and 7. On the exhaust side there are furthermore arranged two exhaust gas turbines 15 and 16 which are mechanically independent of each other. The exhaust gas turbine 15 conveys its energy output to the crankshaft of the internal combustion engine through a transmission comprising the gears 17, 18, 19 and 20. The power output of the exhaust gas turbine 16 drives a compressor 26 which conveys charging air to the engine through the conduit 11.

The turbines 15 and 16 are arranged one behind the other in such a way that the exhaust gases received from the collecting manifold 12 first pass through the turbine 15 and then through turbine 16. From the turbine 16, the exhaust gases pass through a conduit 21. The two exhaust gas collecting manifolds 13 and 14 lead into a chamber 22 in front of the turbine 16 and are so designed that the pressure wave entering the conduit when the auxiliary outlet valve of each cylinder is opened will after reflection at the end of the conduit arrive as low pressure wave in the cylinder prior to the closure of the auxiliary outlet valve. The operation of the engine determining the valve control will be ascertained from the graph of Fig. 1 and the description thereof set forth above.

It is, of course, to be understood that the present invention is, by no means, limited to the particular construction shown in the drawings but also comprises any modifications within the scope of the appended claim.

What we claim is:

In combination in a four stroke cycle internal combustion engine with fuel injection having a cylinder and a piston reciprocably mounted therein: a supercharging compressor, an inlet valve connected to said engine cylinder and with the compressor for receiving air under charging pressure from the compressor, a main outlet valve connected to said cylinder for releasing exhaust gas from the cylinder, a plurality of exhaust gas turbines mechanically independent of each other but arranged for the serial flow of gas therethrough and connected with said outlet valve so that the exhaust gas from the engine will flow through the turbines in series, the turbine through which the exhaust gas first passes being drivingly connected to said engine to convey energy thereto and having the flow passages therethrough for gas sufficiently small in cross section so that the pressure at the inlet side of the said turbine at full load, at which the charging pressure is highest, will be at least as high as the charging pressure, the turbine which the said exhaust gas passes through last being drivingly connected to said compressor for driving the compressor, said compressor and the said driving turbine therefore being so selected that the charging pressure developed by the compressor at least at full load is higher than the pressure at the inlet of the compressor driving turbine, an auxiliary outlet valve connected to the engine cylinder, said auxiliary outlet valve opening shortly after the working piston has commenced its suction stroke so that the pressure which prevails in the cylinder at the start of said suction stroke will be reduced by the movement of the working piston and by the opening of said auxiliary outlet valve, the said pressure prevailing in the cylinder being thus reduced substantially to atmospheric pressure or substantially to the pressure prevailing at the inlet of said compressor driving turbine, said pressure reduction occurring before said inlet valve commences to open, said outlet valve connecting said cylinder with the inlet side of the compressor driving turbine, and said auxiliary outlet valve closing shortly after the inlet valve of the cylinder has opened.

References Cited in the file of this patent

UNITED STATES PATENTS

| 1,624,850 | Steele | Apr. 12, 1927 |
| 1,634,797 | Newton | July 5, 1927 |
| 1,849,170 | Buchi | Mar. 15, 1932 |
| 1,895,538 | Buchi | Jan. 31, 1933 |
| 1,994,167 | Berstler | Mar. 12, 1935 |
| 2,131,959 | Kadenacy | Oct. 4, 1938 |

FOREIGN PATENTS

| 457,712 | France | Sept. 24, 1913 |
| 699,846 | Great Britain | Nov. 18, 1953 |